July 13, 1937.  H. P. MILLER, JR  2,087,003
INDUCTANCE ELEMENT
Filed April 28, 1934  7 Sheets-Sheet 1

INVENTOR
HERMAN POTTS MILLER JR.
BY
ATTORNEY

July 13, 1937.   H. P. MILLER, JR   2,087,003
INDUCTANCE ELEMENT
Filed April 28, 1934   7 Sheets-Sheet 2

INVENTOR
HERMAN POTTS MILLER JR.
BY
ATTORNEY

July 13, 1937.  H. P. MILLER, JR  2,087,003
INDUCTANCE ELEMENT
Filed April 28, 1934  7 Sheets-Sheet 3

INVENTOR
HERMAN POTTS MILLER JR.
BY
ATTORNEY

July 13, 1937.                H. P. MILLER, JR                      2,087,003
                              INDUCTANCE ELEMENT
                           Filed April 28, 1934            7 Sheets-Sheet 4

INVENTOR
HERMAN POTTS MILLER JR.
BY
ATTORNEY

July 13, 1937.  H. P. MILLER, JR  2,087,003
INDUCTANCE ELEMENT
Filed April 28, 1934  7 Sheets-Sheet 5

INVENTOR
HERMAN POTTS MILLER JR.
BY
ATTORNEY

July 13, 1937.  H. P. MILLER, JR  2,087,003
INDUCTANCE ELEMENT
Filed April 28, 1934   7 Sheets-Sheet 7

INVENTOR
HERMAN POTTS MILLER JR.
BY
ATTORNEY

Patented July 13, 1937

2,087,003

UNITED STATES PATENT OFFICE 2,087,003

INDUCTANCE ELEMENT

Herman Potts Miller, Jr., Harrisburg, Pa.

Application April 28, 1934, Serial No. 722,880

36 Claims. (Cl. 178—44)

This invention relates to a method of and means for employing dielectric mediums to control electric currents and more particularly for employing dielectric mediums whose impedance characteristics are adjustable. This application is a continuation in part of application Serial No. 598,233 filed March 11, 1932 Patent Number 1,960,415 granted May 29, 1934.

Distributed capacitance occurs in all forms of inductance elements used in electrical systems due to the proximity of their conductors. It acts as a condenser in shunt with the inductance element and forms a resonant circuit which may have sufficient impedance at certain frequencies to efficiently control fundamental, harmonic, parasitic, or transient waves in an electrical system. At other frequencies the desired control is not obtainable. In the present invention the distributed capacitance is adjusted to give the desired control and especially by associating with it dielectric mediums whose losses are low at certain frequencies but may be high at others and whose losses may be adjusted to desired values at particular frequencies by methods described hereinafter. This adjustment is applied particularly to choke coils for use in high frequency transmitters and in transmission circuits.

It is an object of this invention to employ the dielectric medium of condenser elements for characterizing the impedance of an electrical system.

Another object of this invention is to obtain a dielectric medium for the electrostatic field of an inductance element which will cause the impedance of the element to vary with the frequency of the field in a manner which may be prearranged.

Another object of this invention is to vary the phase and amplitude of currents at one or more frequencies in at least one branch of an electrical circuit by treating the dielectric medium of condenser elements associated with that circuit.

Another object of this invention is to provide in an electrical system an improved method of and means for attenuating the currents of one or more frequencies and wave form in a part of the system without decreasing the efficiency of the system at the same or at other frequencies.

A further object of this invention is to provide means for changing the impedance of an inductive element either automatically while in use or through treatment of the dielectric medium in its distributed capacitance.

A still further object of this invention is to employ a reactance including condenser elements for coupling two or more electrical circuits and to control the characteristics of such coupling through treatment of the dielectric medium in the condenser elements.

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawings in which like reference characters represent like elements and in which:

Fig. 4 represents diagrammatically the reactances and resistances of such an inductor, while

Fig. 10 shows diagrammatically a method for using inductance elements employing the principles of this invention for maintaining high operating efficiency in a high frequency generating system, while

Fig. 12 is an elevation of a form of radio frequency choke coil known in the art, while

In this invention use is made of a so-called "polar" dielectric whose dielectric constant increases with the frequency over one frequency range and decreases with the frequency over another. Such a dielectric is said to have "normal" dispersion when the dielectric constant increases with frequency and "anomalous" dispersion when it decreases with frequency. Most dielectrics have marked normal dispersion by only the polar dielectrics have been found to have both normal and anomalous dispersion. In polar dielectrics high values of dielectric loss and power factor are also obtained at or near a particular frequency called the "characteristic" frequency. These properties have been observed in polar dielectrics including gases, such as ammonia and sulfur dioxide; liquids, such as water, alcohol, castor oil and glycerine; and solids, such as ice and rosin. Each medium has a characteristic frequency of its own some of which are known in the art, the range of such frequencies being approximately from zero to $5 \times 10^{10}$ cycles per second and possibly higher.

Figure 1:
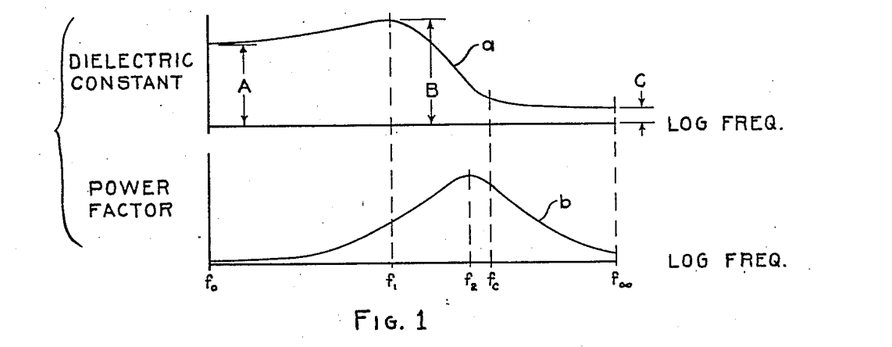
Fig. 1 shows curves illustrating the manner in which the properties of dielectric mediums employed in this invention vary with the logarithm of the frequency.

Fig. 1 shows the approximate manner in which the dielectric properties of a medium having anomalous dispersion vary with the logarithm of the frequency, curve $a$ being the dielectric constant and curve $b$ the power factor. In curve $a$ for the range of normal dispersion the dielectric constant rises from a value A at a low frequency $f_0$ to a value B at a frequency $f_1$. In the range of anomalous dispersion it drops from the value B to a value C at a very high frequency $f\infty$. The power factor, curve $b$, starts with a low value at $f_0$, rises to a peak value at a frequency $f_2$ and returns to a low value at $f\infty$. The characteristic frequency $f_c$ is higher than either $f_1$ or $f_2$ and may be approximately determined by the following equation:

$$f_c = \frac{T}{\eta} K$$

where T is the absolute temperature, $\eta$ is the coefficient of viscosity, and K is a constant depending on the size of the molecules in the dielectric used. The relative position of $f_c$ with reference to $f_1$ and $f_2$ for a given medium remains the same when $f_c$ is changed so that increasing T or decreasing $\eta$ will increase $f_1$ and $f_2$ as well as $f_c$.

To obtain a desired power loss in the distributed capacitance of a coil at a given frequency a dielectric medium may be selected whose value of $f_2$ under normal conditions of temperature T and viscosity $\eta$ is the same as the given frequency and whose power factor at $f_2$ is higher than necessary to produce the desired loss. Adjustment to the proper loss may then be made by raising or lowering the temperature T. The temperature and viscosity are in many cases interdependent so that an increase in temperature causes a decrease in viscosity. For this reason when starting with $f_2$ at the given frequency a slight increase in temperature will shift $f_2$ to a much higher frequency and cause a very large decrease in the loss, while a corresponding decrease in temperature will shift $f_2$ to only a slightly lower frequency and cause very little decrease in the loss. Referring to curve $a$ it is seen that these changes in loss will be accompanied by changes in dielectric constant. Increasing the temperature will increase the dielectric constant up to the value B and then decrease it to the value A. Decreasing the temperature will decrease the dielectric constant to the value C. It has been found that the effect of decreasing the viscosity may be obtained without changing the temperature by diluting the medium with a less viscuous medium. If the diluting medium also has the properties of anomalous dispersion, two characteristic frequencies will be obtained and hence a high power factor will occur over two different frequency bands. If the diluting medium does not have these properties, its effect will be simply that of decreasing the viscosity. In many dielectrics benzene and carbon tetrachloride may be used for diluting purposes. In the case of gaseous dielectrics the viscosity may be changed by adjusting the gas pressure.

Another method of changing the properties of a polar dielectric is to change the potential gradient of the applied field. Increasing the potential gradient to a high value will change the power factor and dielectric constant in a manner similar to that of heating the dielectric. This method of change is particularly useful in coils employed for suppressing parasitic or transient waves. By proper design of the coil, in a manner that will be readily apparent from the description given hereinafter, certain portions of the dielectric in its distributed capacitance may be subjected to much greater potential stresses than others. Under the influence of a transient wave with steep wave front these portions will have their properties altered and the reactance characteristics of the coil will change so as to more effectively suppress the transient wave.

Figure 2:
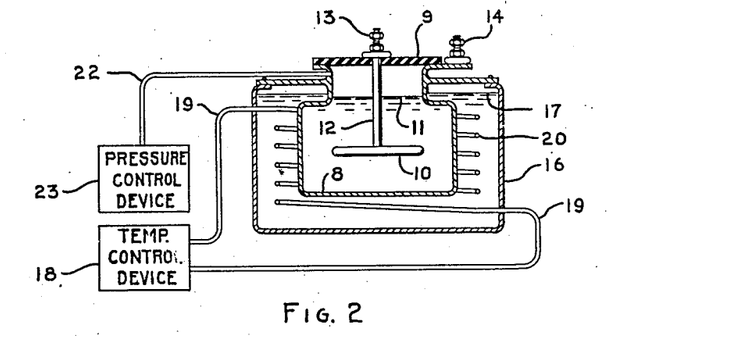
Fig. 2 is a vertical section of a condenser used for determining the properties of dielectric mediums employed in this invention.

Fig. 2 shows a form of condenser which may be employed to select dielectric mediums for use with coils in accordance with the principles of this invention. In these drawings a metal container 8 of any suitable conducting material, such as iron or copper, has mounted on its top opening an insulating plate 9 of suitable material and dielectric strength. The plate 9 is attached to the container 8 in a manner to maintain the desired conditions of temperature and pressure within the container. Inside of the container 8 and suitably spaced with reference to its sides is a metal condenser plate 10 shaped in a manner to equalize the electrostatic stress in a dielectric medium 11 placed between the plate 10 and the container 8. The medium 11 may be suitable for use in the distributed capacitance of a coil and may be a gas, a liquid, or a solid having the properties of anomalous dispersion as enumerated above; a combination of two or more substances having these properties; or a combination of one or more of such substances with one or more substances not having the properties of anomalous dispersion. The plate 10 is supported by a suitable conducting rod 12 which may be fastened to the insulating plate 9 and which has on its upper end a suitable connection terminal 13. Another connection terminal 14 may be attached to the container 8. Surrounding the container 8 and connected to it in a manner to form an enclosing jacket is another container 16 of metal, wood, or a suitable heat insulating material. The jacket between containers 8 and 16 may be filled with a medium 17 capable of storing heat and of maintaining the temperature of the dielectric 11 at the desired value through the use of a temperature control device 18, connecting tubes 19, and circulating coil 20 in the well known manner. The pressure of the dielectric medium 11 may be maintained at any value, such as that required to obtain the desired characteristic frequency $f_c$, through a connecting tube 22 by means of a suitable pressure control device 23.

With a condenser of the type shown in Fig. 2 a dielectric medium of power factor and dielectric constant to meet specified operating conditions at a given temperature may be selected for the distributed capacitance of any particular type of coil in the manner outlined above. I have found, for example, that a condenser containing a commercial grade of castor oil at a temperature of 70 degrees Fahrenheit when inserted in the radio frequency circuit of an oscillator would not permit oscillations at $45 \times 10^6$ cycles per second. Diluting the castor oil with carbon tetrachloride made oscillations possible due to the shift of the frequency $f_2$ to a higher value. With a solution of 90% castor oil and 10% carbon tetrachloride by weight oscillations were obtained at this frequency and temperature. Raising the temperature of the mixture to 95 degrees Fahrenheit caused the power factor to decrease by at least 3%. Information of this type may be employed in designing coils in accordance with this invention.

Figure 3:
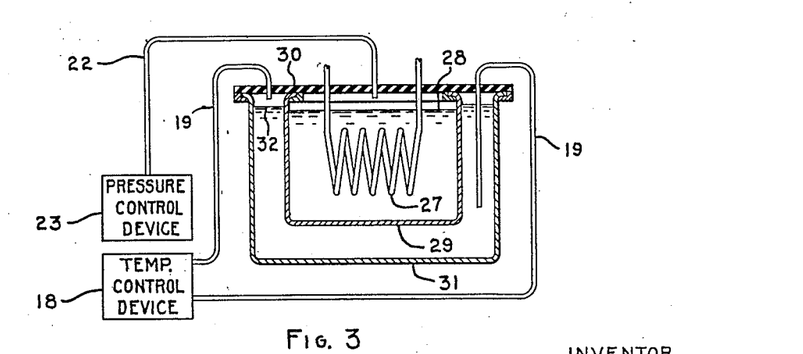
Fig. 3 is a vertical section illustrating a method for treating the electrostatic field of an inductor.

Fig. 3 shows the manner in which the principles of this invention may be applied to the distributed capacitance of an inductor consisting of a spiral winding 27 constructed in such a manner as to give the desired inductance, resistance, and distributed capacitance. This is a simple form and illustrates the fundamental principles of practical choke coils. Surrounding this winding, or associated with it in a way to influence its electrostatic field, is a dielectric medium 28 which may be similar to and have the same properties as the dielectric medium 11 in Fig. 2. The medium 28 may be enclosed in a container 29 of a suitable material, such as glass, quartz, or copper, and constructed in such a manner as to have negligible effect on the electrostatic and magnetic fields of the winding 27. An insulating plate 30 of suitable material and dielectric strength may be attached to an opening in the container 29 in a manner to maintain desired conditions of temperature and pressure within the container. Surrounding the container 29 and attached to the plate 30 is a container 31 containing a medium 32, preferably a poor electrical conductor, such as water or insulating oil, which is capable of storing heat and maintaining the temperature of the medium 28 at the desired value. The temperature of the medium 32 and the pressure of the medium 28 may be maintained at desired values by control devices 18 and 23 similar to those in Fig. 2.

Figure 4:
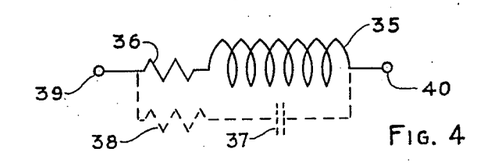
Figure 5:
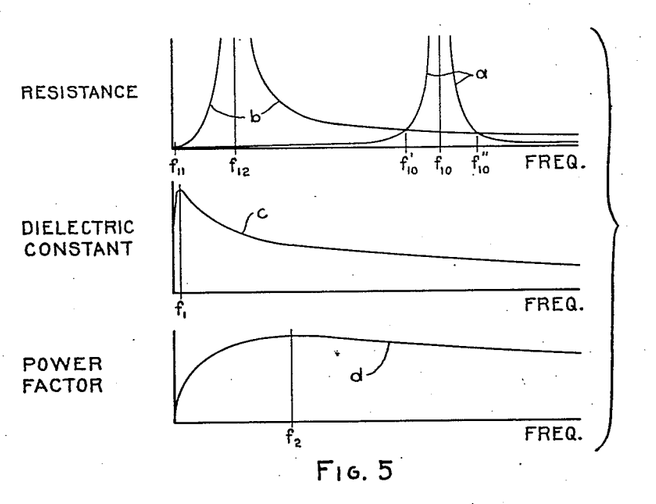
Fig. 5 shows the manner in which certain properties of this inductor vary with the frequency.

Figs. 4 and 5 illustrate the effect of a dielectric medium having anomalous dispersion on the effective resistance of an inductor, such as winding 27 in Fig. 3. It is well known that the electrical characteristics of a winding of this type may be represented diagrammatically as in Fig. 4 in which inductor 35 and resistor 36 represent the inductance and resistance respectively of the winding, and condenser 37 and resistor 38 the distributed capacitance and its dielectric resistance. The effective resistance of this combination to a potential applied across terminals 39 and 40, when the dielectric medium is air, will vary with the frequency approximately in the manner shown in curve $a$ of Fig. 5. In this curve frequency $f_{10}$ represents the resonant frequency of the inductor 35 and the condenser 37. Suppose now that the winding is surrounded with a dielectric medium whose dielectric constant and power factor vary in the manner shown in curves $a$ and $b$ of Fig. 1 and the corresponding curves $c$ and $d$ of Fig. 5. Due to the greater dielectric constant of the medium, the condenser 37 will have a higher capacitance and the resonant frequency of the winding will be shifted to a lower frequency $f_{12}$. The effective resistance of the winding will then vary approximately as shown in curve $b$ of Fig. 5. It is seen that the resistance at frequency $f_{11}$ is the same for both curves $a$ and $b$ but that curve $b$ has a broader peak and does not decrease as rapidly at the higher frequencies. This effect is due mainly to the shapes of the dielectric constant and power factor curves. It is only at frequencies between $f_{10}'$ and $f_{10}''$ that curve $a$ has higher values than curve $b$. Considerable adjustment of resistance values over particular frequency ranges may be obtained by selection of the dielectric medium and the adjustment of its temperature. It is also possible to combine the effects of windings whose peak frequencies $f_{12}$ have widely different values.

A winding having the resistance characteristics of curve $b$ in Fig. 5 may be advantageously employed in a conductor carrying current at a very low frequency, such as 60 cycles per second. At this frequency its impedance would be low, but at high frequencies both its resistance and reactance would be high. If the reactance happened to be tuned out at certain high frequencies by reactance of opposite sign in the conductor or its terminal equipment, the resistance would still be high enough to attenuate voltages at these frequencies. Using a winding having a resistance curve as in $a$ of Fig. 5, only frequencies in the neighborhood of $f_{10}$ would be attenuated. At other frequencies the resistance would be low and the winding might resonate with the conductor and terminal equipment thus helping to increase the amplitude of undesired high frequency voltages.

Figure 6:
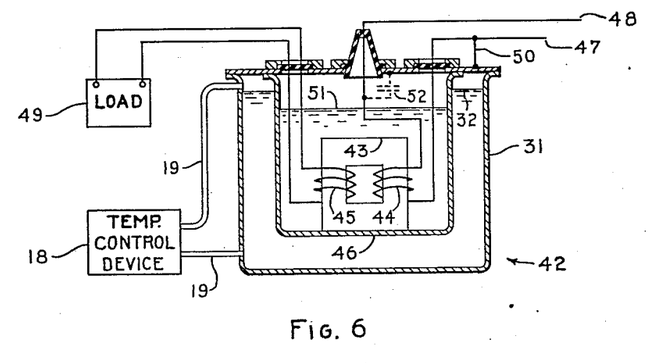
Fig. 6 is a vertical section of a transformer employing the principles of this invention in the distributed capacitances of its windings.

Fig. 6 shows the manner in which the principles illustrated in Figs. 4 and 5 may be applied to the protection of the windings of a transformer 42. This transformer may be of a form well known in the art, such as the shell type employed on frequencies in the neighborhood of 60 cycles per second, and consists of a steel core 43 on which are positioned a primary winding 44 and a secondary winding 45. The core 43 rests on and is in electrical contact with a steel shell 46. Connections from the windings 44 and 45 may be made to transmission line conductors 47 and 48 and to a suitable load 49. Conductor 47 may be connected to the shell 46 through a suitable jumper 50. Instead of using a medium such as insulating oil for cooling the core 43 and windings 44 and 45, a dielectric medium 51 having the properties of anomalous dispersion, as described hereinabove, may be employed. The temperature of the dielectric medium 51 may be maintained at a desired value in the same manner as in Fig. 3 by a container 31, medium 32, temperature control device 18 and connecting tubes 19. The effective distributed capacitance from the high potential conductor 48 and the winding 44 to the shell 46 may be represented schematically by a condenser 52.

The winding 44 of transformer 42 may be subject to the effects of voltages of high frequency and steep wave front impressed on the conductors 47 and 48 by methods enumerated hereinafter. These voltages may be high enough to damage the insulation on winding 44 or to induce sufficient voltage into the winding 45 to damage insulation or cause other undesirable effects in that winding and in the load 49. By the use of a dielectric medium 51 having the properties of anomalous dispersion, the capacitance of condenser 52 is made large so that it effectively shunts the winding 44 and attenuates the high frequency voltages. This reduces the dangerous voltages impressed on the windings 44 and 45 and the load 49 and thus eliminates possible short circuits and insulation breakdowns.

Figure 7:
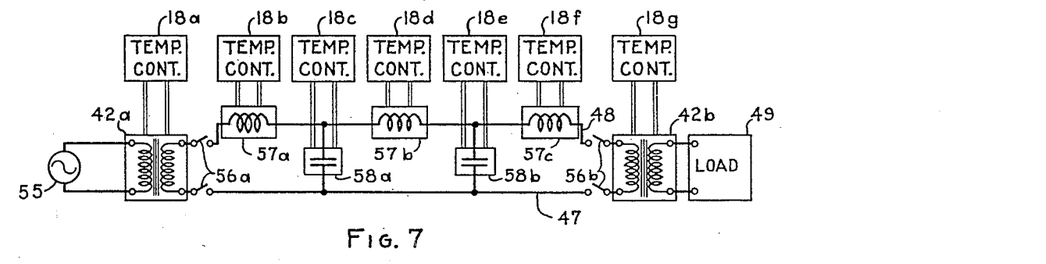
Fig. 7 shows diagrammatically a power transmission system employing a number of elements utilizing this invention.

Referring now to Fig. 7 there is shown a complete system for transmitting power from an alternating current generating source 55 to a load 49 and employing many embodiments of my invention. The source 55 and load 49 may be connected to the transmission line conductors 47 and 48 through suitable switches 56a and 56b and transformers 42a and 42b of the type shown in Fig. 6. In the conductor 48 may be inserted choke coils 57a, 57b, and 57c of the form shown in Fig. 3. Similar choke coils may also be inserted in conductor 47 if necessary. Between the conductors 47 and 48 at points subject to undesired high voltages may be positioned condensers 58a and 58b of the form shown in Fig. 2. Each of the elements employing the principles of this invention may be provided with a suitable control, such as a temperature control device 18a, 18b, 18c, ... and 18g. Pressure control devices, as shown in Figs. 2 and 3, have been omitted from Fig. 7 for the purpose of simplifying the drawings. These elements may be adjusted to cooperate with each other in providing the desired impedance characteristics in different parts of the system. While a single phase transmission system has been shown for purposes of illustration, it is to be understood that these elements may be similarly applied to polyphase systems.

It is well known in the art that in addition to the fundamental and harmonic voltages from the source 55 destructive voltages of high radio frequency and steep wave front may be impressed on the system of Fig. 7 by surges due to opening or closing of the switches 56a and 56b; by lightning strokes to the conductors 47 and 48 or objects associated therewith; by short circuiting arcs between lines 47 and 48 or between elements of opposite polarity in the system; or through coupling with adjacent transmission systems. Due to the flexibility provided in employing the principles of this invention, the impedance characteristics of the system may be adjusted so as to effectively attenuate all such disturbances to a harmless point without affecting its operation at the desired frequencies. Since these disturbances are generally momentary in character and would cause little heating of the dielectrics, the operating temperatures of the elements may be constant enough to permit the elimination of the temperature control devices 18a, 18b, 18c, ... and 18g.

A specific embodiment of the system of Fig. 7 is the alternating current power supply for a radio receiver. In this case source 55 may be a power supply of the type used in lighting houses and buildings and load 49 may be the radio receiver. It is well known that various forms of radio interference, such as the effect of commutator sparking in household appliances, may be transmitted to the radio circuits of the receiver through the power supply. This may cause undesirable noise in the loud speaker. Its effects may be eliminated by employing between the source 55 and load 49 one or more of the elements indicated in accordance with the principles of this invention.

Figure 8:
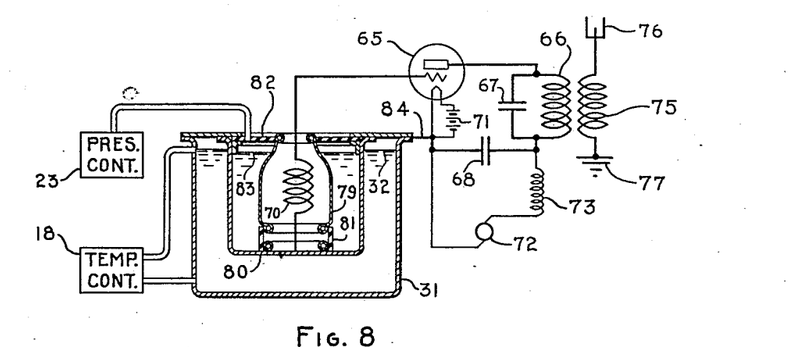
Fig. 8 illustrates in a vertical section and diagrammatically a method for eliminating undesired effects of distributed capacitance in a high frequency generating system.

In Fig. 8 is shown a high frequency transmission system in which the principles of my invention are employed to prevent the generation of undesired parasitic oscillations. This system may employ a vacuum tube oscillator of any suitable form, the one shown consisting of a vacuum tube 65, plate circuit inductor 66, plate circuit condenser 67, by-pass condenser 68, grid inductor 70, filament energizing source 71, plate energizing source 72, and choke coil 73. To the inductor 66 may be coupled a load circuit comprising a coupling inductor 75, antenna 76, and ground 77. Surrounding the grid inductor 70 and insulated therefrom may be placed a shield 79 of copper, or the like, and formed so as to intercept the electrostatic field between the inductor and the filament connection without affecting the magnetic field of the inductor. The shield 79 may be supported away and insulated from a container 80 by means of an insulating tube 81 and an insulating disk 82 of porcelain, glass, quartz, or the like. Between the shield 79 and the container 80 may be placed a dielectric medium 83 having the properties of anomalous dispersion. This may be maintained at a desired temperature and pressure in a manner similar to that in Fig. 3 by means of container 31, medium 32, and control devices 18 and 23. Connection from the inductor 70 to the filament of tube 65 may be made through the container 80, container 31, and a suitable conductor 84.

In a vacuum tube oscillator of the form shown in Fig. 8 considerable heating of the elements in tube 65 has been found to occur on account of the radio frequency current flowing between the plate and the grid. Without the use of elements 79, 80, 81, 82, and 83 this heating has permitted the generation of oscillations of the "dynatron" type. Such oscillations are due to secondary emission from the grid and their frequency is determined by the inductor 70 and its distributed capacitance. By inserting the dielectric medium 83 between the shield 79 and the container 80 a resistance sufficient to stop dynatron oscillations may be introduced into the major portion of the distributed capacitance. This resistance is more effective than an ordinary resistor on account of its capacitive character. Many resistors are inductive at very high frequencies and it can be shown that the actual resistance required in an inductive resistor to prevent such oscillations is greater than with a non-inductive resistor and still greater than with a capacitive resistor. The dynatron oscillations that have been observed in an oscillator of this type were of a much higher frequency than the normal operating frequency, showing that a dielectric medium with the properties of anomalous dispersion might easily have been selected which would have prevented the dynatron oscillations without increasing the losses at the normal operating frequency. It will be readily apparent to those skilled in the art that these principles just described may be used to eliminate the undesired effects of stray capacitance in other parts of radio frequency circuits.

Figure 9:
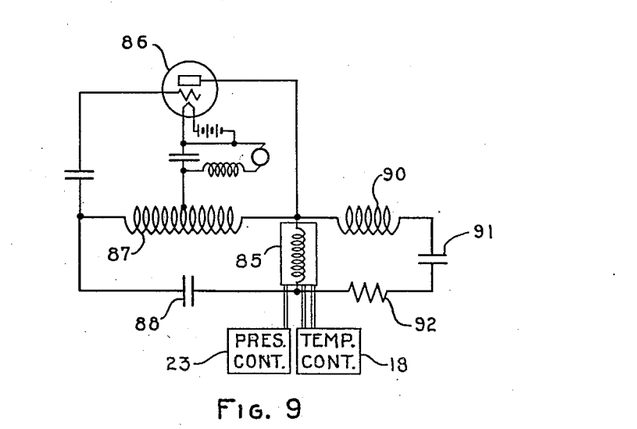
Fig. 9 shows diagrammatically a method for employing an inductance element in accordance with this invention to couple a load circuit to an alternating current generating source.

Fig. 9 shows a radio frequency generating system in which an inductance element 85 of the type shown in Fig. 3 may be employed for coupling a generating source with a load circuit. The generating source may be of any well known type, such as a vacuum tube oscillator of the form shown including a vacuum tube 86, an inductor 87, and a condenser 88. The load circuit may be an antenna or some form of radio frequency circuit which may be represented by an inductor 90, condenser 91, and resistor 92. The inductor 90 and condenser 91 may resonate at the frequency $f_2$ of the dielectric employed in the inductance element 85. (See curve $d$ in Fig. 5.) Similarly the inductor 87 and condenser 88 may also resonate at a frequency near $f_2$. The inductance element 85 then acts as an impedance coupling between the circuit containing elements 87 and 88 and that containing elements 90, 91, and 92. If its resonant frequency $f_{12}$, as shown in curve $b$ of Fig. 5, is below $f_2$, the reactance of the element will be capacitive at frequency $f_2$ and at higher frequencies. It is well known that when impedance coupling is great enough the combined circuits may resonate at either one of two different frequencies and it is often necessary to keep the coupling below the value that will permit this. It has been found that with capacitive coupling and when employing a dielectric medium having the characteristics shown in Fig. 5 greater coupling may be used at frequency $f_2$ without permitting oscillations at other frequencies than is possible with other forms of coupling. This embodiment of my invention therefore retains the advantages of capacitive coupling in keeping harmonic currents out of the load circuit and permits increasing the current of the normal frequency $f_2$ in the load circuit. The degree of coupling may also be very accurately adjusted by means of the temperature control device 18 or the pressure control device 23 depending on the type of dielectric medium used.

It will be readily apparent to those skilled in the art that a condenser employing a dielectric having the properties of anomalous dispersion may be used in place of the inductance element 85.

Figure 10:
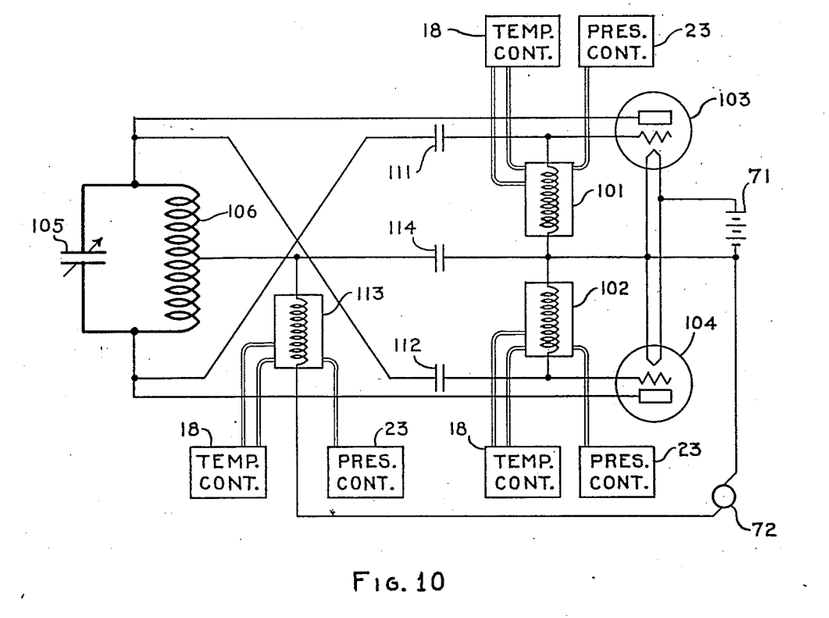

Fig. 10 shows another radio frequency generating system in which choke coils 101 and 102 embodying the principles of my invention are employed to maintain a high operating efficiency over a broad band of frequencies. In this system the plates of vacuum tubes 103 and 104 are connected to opposite ends of a tuned circuit comprising a variable condenser 105 and an inductor 106. The grid of tube 103 is connected through a condenser 111 to the same side of the tuned circuit as the plate of tube 104 and the grid of tube 104 is connected through a condenser 112 to the same side of the tuned circuit as the plate of tube 103. Potential from the generator 72 may be applied to the plates of tubes 103 and 104 through a choke coil 113 and the inductor 106. The choke coil 113 may employ the principles of my invention and may be constructed in one of the forms described below so that its impedance is high in comparison with that of a by-pass condenser 114.

Choke coils 101 and 102 furnish a path for the direct current component of the grid current of tubes 103 and 104 and also help to control the magnitude of the radio frequency voltages impressed on the grids. From the latter standpoint it would be desirable to use a condenser in place of coils 101 and 102. These condensers would be in parallel with the grid to filament capacitance of the tubes so that the grid voltages would be fixed fractions of the plate voltages regardless of the operating frequency. A direct current path is necessary, however, and on this account resistors have been employed but it has been found that they either make the circuit unstable or require critical adjustment of condensers 111 and 112. Plain inductors are undesirable on account of the tuning effect between the inductor and the grid to filament capacitance. By employing a choke coil of one of the forms described below and which has been constructed so as to have capacitive reactance over the entire operating range, the two desired characteristics are obtained. Furthermore, the temperature and pressure control devices 18 and 23 permit adjustment of the reactance of the choke coils to desired values.

While two vacuum tubes 103 and 104 are shown in Fig. 10 it has been found that oscillations may be obtained through the use of only one tube. The circuit would function, therefore, if tube 104, choke 102, and condenser 112 were removed.

Figure 11:
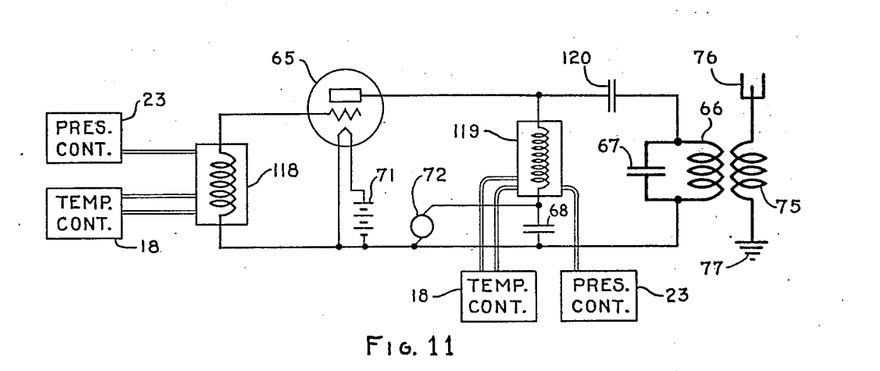
Fig. 11 shows how these elements may be employed to eliminate undesired effects in a high frequency generating system similar to that shown in Fig. 8.

In Fig. 11 are shown certain modifications of the high frequency transmission system shown in Fig. 8. In this system a grid inductor 118 which may be of the form shown in Fig. 3 has been substituted for the inductor 70. Also the method of impressing the potential from generator 72 upon the plate has been changed to the so-called parallel feed. This potential is impressed direct on the plate through a choke coil 119 and is kept off of the tuned circuit 66 and 67 by a stopping condenser 120. It can be shown that by proper selection of the dielectrics the coil 118 may be employed to produce the same results as the coil 70 and its associated dielectrics shown in Fig. 8. This method of using coil 119 imposes restrictions which require very careful design. These will now be discussed.

For efficient operation of the transmission system of Fig. 11 the impedance of coil 119 should be high in comparison with the effective impedance of the tuned circuit including inductor 66 and condenser 67. If the impedance is low, the tuned circuit of 66 and 67 may be detuned and power may be absorbed which would otherwise be radiated from the antenna 76. Satisfactory chokes have been constructed for a limited frequency band, but not for a broad band of frequencies. This has often required the changing of choke coils when changing the frequency of operation. My design would permit the transmission system to be used over a broad band of frequencies without changing chokes, or would permit one design to be used on different systems operating on widely different frequencies.

Figure 12:
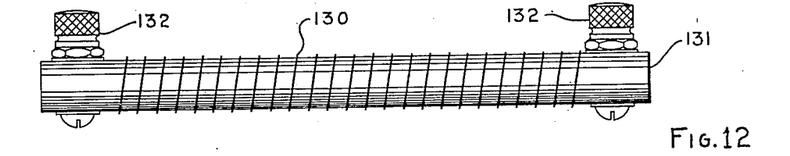

Fig. 12 shows a simple form of choke coil that has been employed in the art for the coil 119. It comprises a single layer winding 130 of suitable conducting material positioned on an insulating member 131 which may be of high grade ceramic or resinous material, glass, paraffined wood, or some other insulating material. The ends of the winding 130 are connected to suitable terminals 132. A developed view of the winding 130 is shown at a in Fig. 13.

Figure 14:
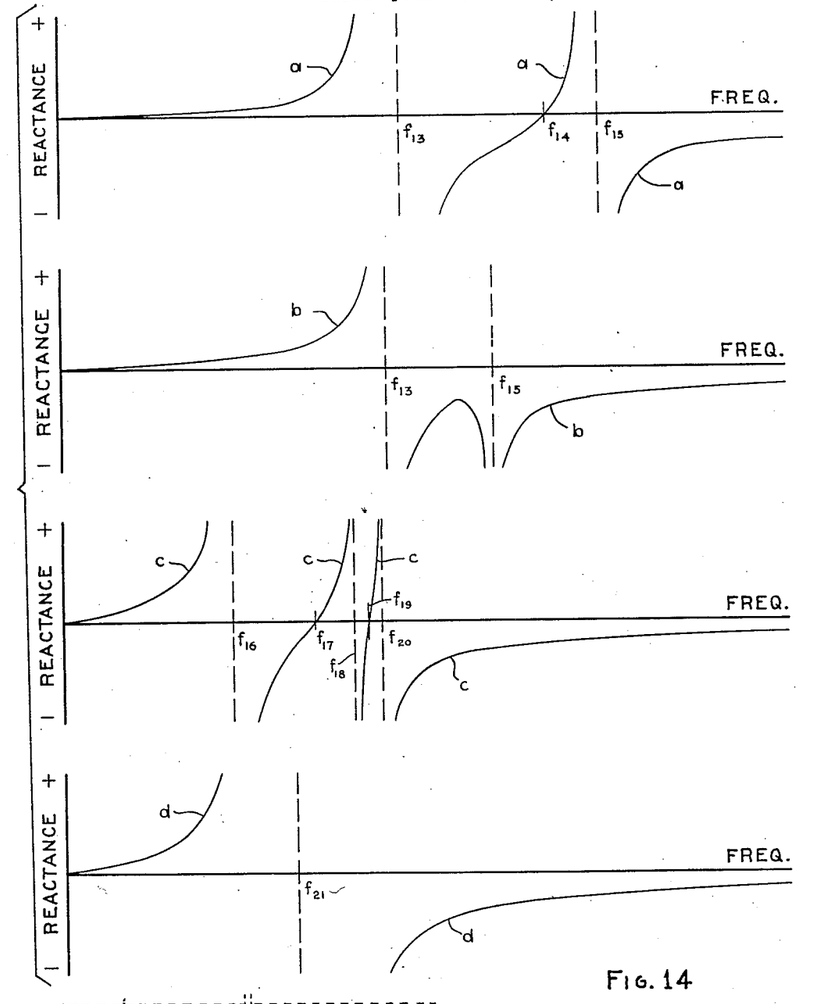
Fig. 14 shows curves illustrating the manner in which the principles of this invention improve the reactance characteristics of different types of choke coils.

The reactance of a coil such as that of Fig. 12 when plotted against frequency gives a curve of the general form shown at a in Fig. 14. The reactance is positive, or inductive, from zero frequency up to a frequency $f_{13}$ where it becomes very high. Above $f_{13}$ it is negative, or capacitive, up to a frequency $f_{14}$ where it is zero. From $f_{14}$ to $f_{15}$ it is inductive and above $f_{15}$ it is capacitive. Frequency $f_{13}$ is often termed the resonant frequency of the coil since it is the frequency at which the coil resonates in the manner of a half wave radiator. At this frequency the current in the coil is small at the ends and large in the middle. At $f_{14}$ the coil resonates as a full wave radiator with large current at the ends. At $f_{15}$ one and a half wave radiations are obtained with small currents at the ends. At this frequency the inductive reactance of a single turn becomes so high with respect to the capacitive reactance of the distributed capacitance between adjacent turns that the inductance of the winding no longer has any control over the current through the coil and the current passes through the distributed capacitance. I have found that a resonating coil differs from a wire radiator used for antennas in that $f_{14}$ is less than twice $f_{13}$ and $f_{15}$ is proportionately still less than three times $f_{13}$.

A coil having the reactance characteristics of a in Fig. 14 is satisfactory for use as coil 119 in Fig. 11 only when the operating frequency of the system is close to either $f_{13}$ or $f_{15}$. At frequency $f_{14}$ so much power would be absorbed by the coil that little power would be radiated from the antenna 76. It is, therefore, very desirable to eliminate any point of zero reactance.

A coil of the form shown in Fig. 12 has been placed in a bath of glycerine in a manner corresponding to that of Fig. 3. It was found, however, that the main effect of this was to decrease the values of $f_{13}$, $f_{14}$, and $f_{15}$. When the winding was changed to correspond with that of c in Fig. 13, a reactance curve of the form shown in curve b of Fig. 14 was obtained. In this curve the frequency $f_{14}$ is not present so that the coil may be used on frequencies between $f_{13}$ and $f_{15}$.

Figure 13:
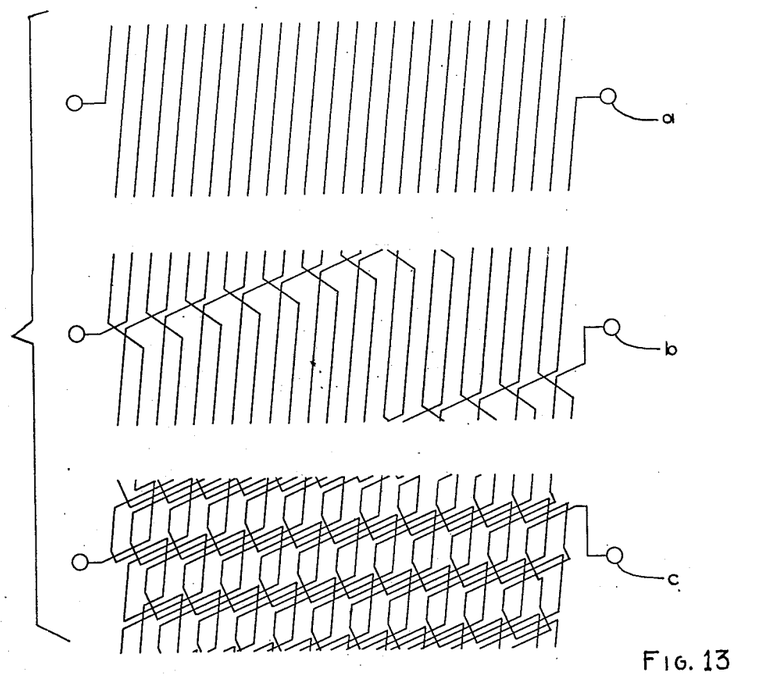
Fig. 13 shows in development three types of windings which may be employed on this choke coil.

The manner in which winding c of Fig. 13 is constructed can be understood from the simplified winding b in the same figure. After one turn has been made in this winding the turn is crossed and a turn placed above the first turn. The third turn is placed below the first and the fourth between the first and the third. In other words, the even numbered turns lap back over the odd numbered turns. In winding c, except at the ends, the conductor laps back over two turns twice each turn for the even numbered turns and once each turn for the odd numbered turns. Other forms of similar windings in which the conductor is placed alternately above and below a single spiral line for the purpose of increasing the distributed capacitance of the winding may be readily constructed by those skilled in the art.

Figure 15:
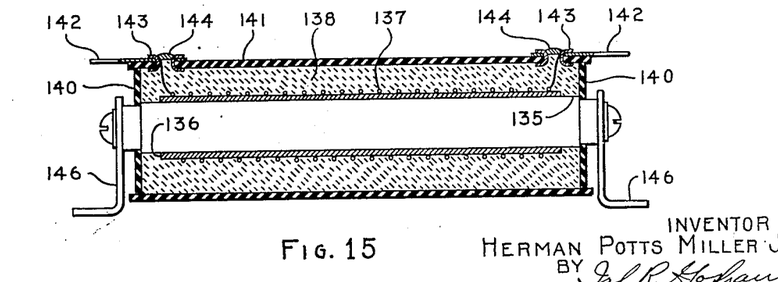
Fig. 15 is a vertical section of a choke coil similar to that of Fig. 12, but employing the principles of this invention.

Fig. 15 shows the manner in which an inductive winding similar to Fig. 12 may be constructed in accordance with this invention without making special provisions for temperature and pressure control of the dielectric as in Fig. 3. About a mandrel 135, of a ceramic or resinous material, glass, or other suitable insulating material, are positioned consecutively an absorbent tube 136, an inductive winding 137, and a dielectric medium 138 which may be similar to medium 11 in Fig. 2. The winding 137 may be covered with and the tube 136 may be made of paper, cotton, silk, or other material that will readily absorb some of the dielectric 138. Insulating disks 140 on the ends of mandrel 135 support an insulating tube 141 in a manner to readily retain the dielectric 138. Soldering terminals 142 are fastened to each end of tube 141 by tubular rivets 143. Drops of solder 144 are placed on each rivet 143 to connect the ends of winding 137 to the terminals 142 and also to close the holes in the rivets so as to retain the dielectric 138. Supporting brackets 146 may be suitably attached to the ends of the mandrel 135.

In employing silk or cotton covered wire wound in one of the methods shown in Fig. 13 and with glycerine for a dielectric, I have used the following procedure to retain the glycerine around the winding. After completing the winding 137 and before placing it in tube 141, the winding has been thoroughly dehydrated and then soaked in a bath of hot glycerine. The tube 141 with one disk 140 attached was then placed over the winding and the ends of the winding were soldered to the terminals 142. The space between winding 137 and tube 141 has then been filled with a hot viscuous dielectric, described below, and the second disk 140 put in place. When cool this dielectric has become rubber-like, has not softened with heat, and has readily retained the glycerine in the winding.

The viscuous dielectric used for 138 was made by thoroughly mixing 10 parts by volume of powdered gelatine with 25 parts of glycerine and heating same to 50 degrees centigrade for one hour. The mixture was then heated to 110 degrees centigrade and allowed to cool to 100 degrees. To this were then added 3 parts of furfural. This mixture was well stirred and quickly poured into the tube 141. After cooling for a few days, the mixture would no longer become liquid with heat. Glycerine retains its own properties in this mixture. There is no chemical reaction, it being simply retained in the inside pores of the gelatine due to the outside pores having been closed by the action of the furfural.

Figure 16:
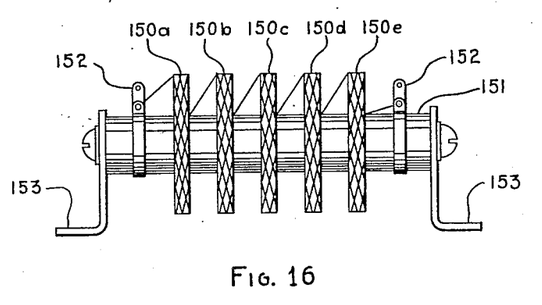
Fig. 16 shows in elevation a form of choke coil known in the art.

Fig. 16 shows a form of choke coil which has frequently been employed for coil 119 in Fig. 11. It comprises a number of small windings 150a, 150b, 150c, etc. positioned on an insulating mandrel 151 of a ceramic or resinous material, glass, or some other type of high grade insulating material. The windings 150a, 150b, 150c, etc. may be of the basket-weave type, they may be varnished to hold the turns together, and may be mounted mutually aiding with the inside of one winding connected to the outside of a winding next to it. Suitable soldering terminals 152 for external connections and supporting brackets 153 may be attached to the ends of mandrel 151.

Figure 17:
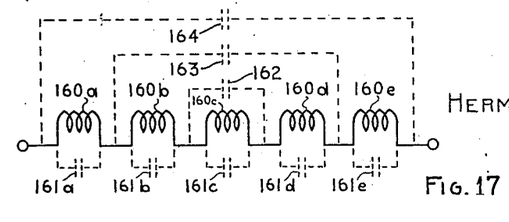
Fig. 17 represents diagrammatically the reactance elements in such a choke coil.

It has been found that the coil of Fig. 16 may be represented diagrammatically by the circuit of Fig. 17 in which 160a, 160b, 160c, 160d, and 160e represent the inductance of the windings 150a, 150b, 150c, etc. and 161a, 161b, 161c, 161d, and 161e represent the distributed capacitance across each of these windings. Condensers 162, 163, and 164 represent the distributed capacitance between coils. No resistance has been shown as it is usually small in coils of this type. The inductance of 160a, 160b, 160c, etc. is assumed to be the same, although actually that of 160c will be greater than of the others due to greater mutual coupling with the other coils.

Condensers 161a, 161b, 161c, etc. are assumed to be equal. Condenser 163 is larger than 164 while condenser 162 is larger than 163.

The variation of reactance with frequency for the circuit of Fig. 17 is shown in curves c of Fig. 14. It will be noted that infinite reactance occurs at frequencies $f_{12}$, $f_{18}$, and $f_{20}$. Zero reactance occurs at frequencies $f_{17}$, and $f_{19}$. A choke coil having these characteristics could, therefore, not be employed as coil 119 in Fig. 11 near frequencies $f_{17}$ and $f_{19}$. I have found that zero reactance at these two frequencies is due to the resonant frequencies of the coils 160a, 160b, 160c, 160d, and 160e not being the same. This I attribute to difference in inductance due to variation in mutual coupling and also to the differences in capacitance between condensers 162, 163, and 164. The two frequencies of zero reactance may, therefore, be eliminated by making inductor 160c smaller than both 160b and 160d which are in turn made smaller than 160a and 160e. All of the inductors would then resonate at a single frequency $f_{21}$ and the reactance curve would be approximately as shown in curve d of Fig. 14.

Figure 18:
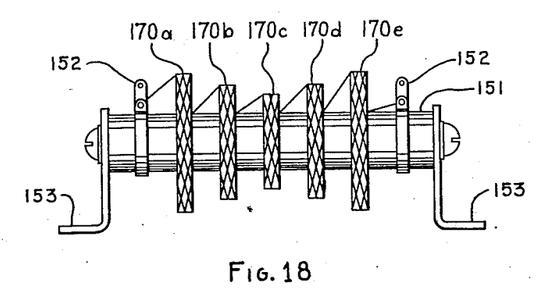
Fig. 18 shows an improved form of the choke coil in Fig. 16.

Fig. 18 shows the manner in which the improvements just described may be applied to the choke coil of Fig. 16. Windings 170a, 170b, 170c, 170d, and 170e are substituted for coils 150a, 150b, 150c, 150d, and 150e and are constructed with 170a and 170e having the greatest number of turns, 170b and 170d with fewer turns, and 170c with the least number of turns. This coil would be an improvement over the coil of Fig. 16 in that it would have high reactance over a broader band of frequencies. While a coil of uneven number of sections is shown in Fig. 18 the same improvement may be obtained in a coil of even number of sections by making the two middle windings of the same size. Likewise, in case the distributed capacitance is not symmetrical with respect to the center of the coil, as would be the case if a large metallic plate were substituted for one of the brackets 153, the number of turns on the windings may be adjusted to take care of this lack of symmetry. The fundamental requirement is to adjust the number of turns so that all windings resonate at approximately the same frequency.

Another method of attaining the same result as with the arrangement of Fig. 18 would be to taper the mandrel 151 from a maximum at each end to a minimum at the middle. This would permit retaining the same number of turns on windings 170a, 170b, 170c, 170d, and 170e. The same principle may also be applied to a winding of the form shown in Fig. 15.

A coil of the form shown in Fig. 12 would be suitable for use over a broad band of frequencies if it were made long enough to give a large number of current nodes and if the effective resistance at the frequencies of zero reactance were extremely high. It would also be suitable if the inductance per unit length were so high in comparison with the capacitance per unit length that operation would be above the frequency $f_{15}$ in Fig. 14, and if the winding length were sufficient to keep the capacitive reactance high. At frequencies commonly employed in radio transmitters this would require an excessively long coil.

Figure 19A:
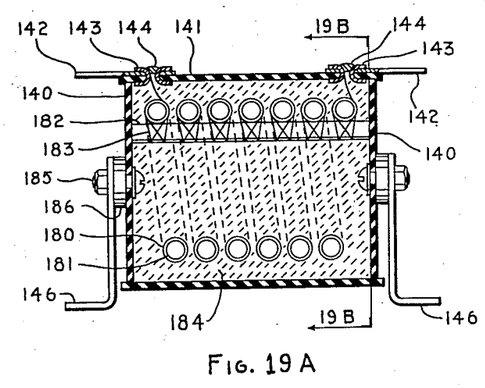
Fig. 19A is a partial longitudinal section and Fig. 19B is a transverse vertical section of Fig. 19A, as indicated, showing another form of radio frequency choke coil employing the principles of this invention.
Figure 19B:
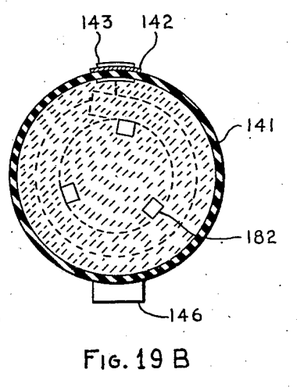

Figs. 19A and 19B show a method for obtaining a long winding in a small and convenient form. In this a winding 180, which may have a small diameter in comparison with its length and which may have one of the forms shown in Fig. 13, is positioned on a flexible core 181. The core 181 may be similar to a woven cotton rope and capable of absorbing a liquid dielectric or it may be of leather, rubber, or some non-absorbent material. The core 181 is wound in the form of a coil and tied to temporary supports, such as wooden strips 182, by suitable cords 183. Surrounding the core winding may be placed an insulating cylinder similar to that in Fig. 15 including insulating disks 140, insulating tube 141, terminals 142, rivets 143, and solder drops 144. Enclosed by the insulating cylinder and surrounding both winding 180 and core 181 may be positioned a dielectric 184 which may be similar to the dielectric 133 in Fig. 15. Supporting brackets 146 may be attached to disks 140 with screws 135 and spacers 136.

It will be readily apparent to those skilled in the art that if the winding 180 is stiff and self-supporting, the mandrel on which it is wound may be removed after winding. In this case the dielectric 184 may take the place of the core 181.

I have found that the diameter, number of turns, and turn spacing of the core winding must be carefully selected for a choke intended to meet specific requirements. It has been pointed out above in connection with curves a of Fig. 14 that a long coil acting as a radiator of an odd number of half wave lengths has a high reactance while one with an even number of half wave lengths has a low reactance. The length of the winding 180 may therefore be selected for either a high or a low reactance at one or more particular frequencies. Each half wave section will have its own magnetic field with its accompanying radiation resistance. Adjacent turns of the core winding will influence each other so as to change the magnetic field and either increase or decrease the radiation resistance. This influence will be small with the entire winding acting as one half wave section, and will increase as the number of half wave sections increases. With one half wave section on two core turns the magnetic field on adjacent turns will be 90 degrees out of phase. With one half wave section on each core turn, the field will be 180 degrees out of phase and with two half wave sections on each turn they will be in phase. This relationship permits designing the coil so that the total radiation resistance is high when the total reactance is low and vice versa. The use of a polar dielectric in a coil of this type permits obtaining more half wave sections on a particular coil at a given frequency and decreases the overall size of the coil. The properties of anomalous dispersion assist due to the broadening effect pointed out in connection with curce b of Fig. 5 and also due to the temperature shifting effect pointed out below.

The spacing between core turns may be adjusted so that the shunting reactance of the dielectric between turns is high in comparison with the reactance per turn. If this shunting reactance is small, the effect of the standing waves on the winding may become negligible.

Another very desirable effect which I have noted with choke coils treated with polar dielectrics is that of an automatic increase in impedance when an attempt is made to operate the choke near a frequency of low reactance. For example, if a coil having the reactance characteristics shown in curce a of Fig. 14 employs a dielectric whose frequency $f_1$ of Fig. 1 occurs at or near $f_{14}$ in Fig. 14 and an attempt is made to operate the choke at the frequency $f_{14}$, the dielectric will be slightly heated due to the losses in it. This will increase $f_1$ so that both the dielectric constant and power factor will decrease. The zero reactance point on curve $a$ of Fig. 14 will then be moved to a higher frequency and the choke will have capacitive reactance at the frequency $f_{14}$. The effective resistance of the choke will be much greater so that the choke impedance will be greater. This shifting effect I have found to be particularly useful in chokes that have not been specifically designed in accordance with any of the methods described above for eliminating the points of zero reactance.

In general the principles of my invention permit imparting to many forms of inductance elements impedance characteristics which are otherwise obtainable only through the use of many reactance and resistance elements in a complicated structure. They permit the use of an inductance element as a low impedance path at very low frequencies and the imparting to that element of desirable reactance and resistance characteristics at very high frequencies. Furthermore they permit the adjustment of the characteristics of a particular element to meet specific conditions.

Many modifications of my improved inductance elements will be apparent to those skilled in the art and my invention therefore, is not to be restricted to the specific embodiments chosen for purposes of illustration, but is to be limited only by the scope of the appended claims.

What I claim is:

1. In an electrical circuit, a supporting member, an inductive winding thereon having distributed capacitance, means for connecting said winding to said circuit, and a dielectric medium having the properties of anomalous dispersion increasing at least a portion of said distributed capacitance, said medium forming a shunt impedance path between said connecting means.

2. In an electrical circuit, a supporting member, an inductive winding thereon having distributed capacitance, means for connecting said winding to said circuit, a dielectric medium having the properties of anomalous dispersion increasing at least a portion of said distributed capacitance and forming a shunt path between said connecting means, and means cooperating with said medium for controlling the impedance characteristics of said shunt path.

3. In an electrical circuit, a substantially cylindrical member, an inductive winding thereon, said winding alternatively advancing and receding with reference to a uniform spiral line on the surface of said member, means for connecting said winding to said circuit, and a dielectric medium having the properties of anomalous dispersion in the field of distributed capacitance of at least a portion of said winding.

4. In an electrical circuit, an inductive winding therein comprising a spiral conductor formed into a second spiral of larger diameter than said first spiral, means for connecting said winding to said circuit, and a dielectric medium having the properties of anomalous dispersion in the field of distributed capacitance of at least a portion of said winding.

5. In an electrical circuit, an inductive winding therein, a capacitance path comprising a plurality of dielectric mediums at least one of which having the properties of anomalous dispersion in shunt with at least a portion of said winding and having a definite impedance at a particular frequency, means for connecting said winding with said path to said circuit, and means for impressing alternating potentials of said particular frequency on said connecting means, said potentials changing the value of said impedance.

6. In combination, a dielectric medium having the properties of anomalous dispersion, a containing structure for said medium, a winding having inductance and distributed capacitance positioned in said medium, a magnetic core increasing said inductance, and means for adjusting the temperature of said medium for changing said capacitance.

7. In combination, a dielectric medium having the properties of anomalous dispersion, a containing structure for said medium, a plurality of windings having inductance and distributed capacitance positioned in said medium, a magnetic core increasing said inductance of at least one of said windings, and means for adjusting the temperature of said medium for changing said capicitance of at least one of said windings.

8. The method of controlling currents in an inductive winding, comprising shunting said winding with a dielectric medium having a peaked value of dielectric constant at certain frequencies and varying the molecular association of said medium.

9. In a system for controlling the transmission of selected frequencies, the combination of an inductive winding, a dielectric element in shunt with said winding having a predetermined impedance characteristic, and means for simultaneously impressing potentials of a plurality of frequencies on said winding and said element, said characteristic varying with the intensity of said potentials.

10. In a system for controlling the transmission of selected frequencies, a combination of an inductive winding, a plurality of dielectric mediums with definite impedance characteristics and at least one of which having the properties of anomalous dispersion in shunt with said winding, and means for adjusting at least one of said impedance characteristics.

11. In an electrical circuit, a supporting member, an inductive winding thereon having distributed capacitance, means for connecting said winding to said circuit, and a plurality of dielectric mediums for increasing at least a portion of said distributed capacitance, at least a portion of said mediums forming a shunt path between said connecting means and at least one of said mediums having the properties of anomalous dispersion.

12. In an electrical circuit, a supporting member, an inductive winding thereon comprising a single layer of insulated conductor having at least one section of each turn substantially in contact with at least one section of a turn more remote than a next consecutive turn, and means for connecting said winding to said circuit, said contacting sections being substantially parallel to each other and at right angles to the axis of said member.

13. In an electrical circuit, a supporting member, an inductive winding thereon comprising a single layer of insulated conductor having at least one section of each turn substantially in contact with at least one section of a turn more remote than a next consecutive turn, means for connecting said winding to said circuit, and a dielectric medium having the properties of anomalous dispersion in the field of distributed capacitance of at least a portion of said winding, said contacting sections being substantially parallel to each other and at right angles to the axis of said member.

14. In an electrical circuit, a supporting member, an inductive winding thereon comprising a plurality of turns of insulated conductor having at least a portion of each turn in substantially parallel contact with at least a portion of a turn more remote than a next consecutive turn, means for connecting said winding to said circuit, and a dielectric medium having the properties of anomalous dispersion in the field of distributed capacitance of at least a portion of said winding, said parallel contacts and said medium increasing at least a portion of said capacitance.

15. In an alternating current circuit, a supporting member, an inductive winding thereon, means for connecting said winding to said circuit, means for increasing the distributed capacitance of said winding, and a dielectric medium having the properties of anomalous dispersion in at least a portion of the field of said distributed capacitance.

16. In an electrical circuit, a supporting member, an inductive winding thereon, means for connecting said winding to said circuit, a conductor surrounding at least a portion of said winding for increasing the distributed capacitance of said winding, and a dielectric medium having the properties of anomalous dispersion in at least a portion of the field of said distributed capacitance.

17. In an electrical circuit, a supporting member, an inductive winding thereon, means for connecting said winding to said circuit, a capacitance path between said connecting means, at least one conductor surrounding at least a portion of said winding for increasing the capacitance of said path, a dielectric medium having the properties of anomalous dispersion in at least a portion of the field of said path, and means for controlling the impedance of said path.

18. In an electrical circuit, a supporting member, an inductive winding thereon, means for connecting said winding to said circuit, a capacitance path between said connecting means, at least one conductor surrounding at least a portion of said winding for increasing the capacitance of said path, a dielectric medium having the properties of anomalous dispersion in at least a portion of the field of said path, and means for adjusting the temperature of said medium for controlling the impedance of said path.

19. In combination, an inductive winding having distributed capacitance, means for impressing alternating potentials on said winding, an enclosing structure for said winding for increasing said capacitance, a dielectric medium having the properties of anomalous dispersion in the field of at least a portion of said capacitance for furnishing resistance to the capacitive currents between said winding and said structure, and means for changing the resistance of said medium to said currents.

20. In an electrical circuit, an inductive winding of a plurality of turns having distributed capacitance across sections thereof, and a dielectric medium having the properties of anomalous dispersion in the field of at least a portion of said capacitance, the average diameter of said turns in each of said sections varying along the axis of said winding to give resonance in said sections at substantially one frequency.

21. In an electrical circuit, an inductive winding of a plurality of turns having distributed capacitance across sections thereof, and a dielectric medium having the properties of anomalous dispersion in the field of at least a portion of said capacitance, the inductance and said distributed capacitance of each of said sections varying along the axis of said winding and their product being substantially the same.

22. In an electrical circuit, a supporting member varying in diameter along the axis thereof, an inductive winding thereon having distributed capacitance, means for connecting said winding to said circuit, and a dielectric medium having the properties of anomalous dispersion in the field of at least a portion of said capacitance, said diameter variation causing prearranged impedance characteristics in said winding.

23. In an electrical circuit, a supporting member varying in diameter along the axis thereof, an inductive winding thereon comprising a plurality of turns uniformly distributed along said axis and having distributed capacitance across sections thereof, means for connecting said winding to said circuit, and a dielectric medium having the properties of anomalous dispersion in the field of at least a portion of said capacitance, said diameter variation giving resonance in said sections at substantially one frequency.

24. In an electrical circuit, a supporting member varying in diameter along the axis thereof, an inductive winding thereon having distributed capacitance across sections thereof, means for connecting said winding to said circuit, and a dielectric medium having the properties of anomalous dispersion in the field of at least a portion of said capacitance, said winding alternately advancing and receding with reference to a spiral line on the surface of said member and said diameter variation giving resonance in said sections at substantially one frequency.

25. In an electrical circuit, a supporting member, an inductive winding thereon having distributed capacitance, means for connecting said winding to said circuit, and a dielectric comprising a mixture of glycerine, gelatine, and furfural in the field of at least a portion of said distributed capacitance.

26. In combination, a winding having inductance and distributed capacitance, a magnetic core for increasing at least a portion of said inductance, and a dielectric medium having the properties of anomalous dispersion for increasing at least a portion of said capacitance.

27. In combination, a winding having inductance and distributed capacitance, a magnetic core for increasing at least a portion of said inductance, a dielectric medium having the properties of anomalous dispersion for increasing at least a portion of said capacitance, and means for adjusting the impedance of said medium.

28. In combination, a plurality of windings having inductance and distributed capacitance, a magnetic core for increasing the inductance of at least one of said windings, a dielectric medium having the properties of anomalous dispersion for increasing at least a portion of the capacitance of at least one of said windings, and means for adjusting the impedance of said medium.

29. In an alternating current circuit, a winding having inductance, a supporting structure therefor comprising a magnetic core for increasing said inductance, means for connecting said winding to said circuit, and a dielectric medium having the properties of anomalous dispersion for forming a shunt impedance path between said connecting means.

30. In an alternating current circuit, a winding having inductance, a supporting structure therefor comprising a magnetic core for increasing said inductance, means for connecting said winding to said circuit, an impedance path between said connecting means comprising a plurality of dielectric mediums at least one of which has the properties of anomalous dispersion, and means for adjusting said impedance of said path.

31. In an electrical circuit, an inductive winding therein having distributed capacitance and comprising a spiral conductor formed into a second spiral of larger diameter than said first spiral, means for connecting said winding to said circuit, and means for increasing said capacitance.

32. In an alternating current circuit, an inductive winding therein having high distributed capacitance at particular frequencies, and means for connecting said winding to said circuit, said winding having at least equal fractions of a current loop in a plurality of sections thereof at selected frequencies, and said sections being positioned adjacent to each other to give predetermined impedance characteristics in said winding at said selected frequencies.

33. In an alternating current circuit, an inductive winding therein having distributed capacitance, a dielectric medium having the properties of anomalous dispersion for increasing at least a portion of said capacitance, and means for connecting said winding to said circuit, said winding having a plurality of current loops therein at particular frequencies the sections of said loops being positioned adjacent to each other to give predetermined impedance characteristics in said winding at selected frequencies.

34. In an alternating current circuit, an inductive winding therein having coupling between sections thereof, a dielectric medium having the properties of anomalous dispersion in the field of distributed capacitance of at least a portion of said winding, and means for connecting said winding to said circuit, said winding having a plurality of current loops therein at particular frequencies and said coupling imparting to said winding definite impedance characteristics at selected frequencies.

35. In an alternating current circuit, an inductive winding connected in said circuit and composed of a plurality of sections having coupling therebetween, and a dielectric medium for increasing the distributed capacitance of each of said sections, the net coupling reaction between each one of said sections and the remainder of said sections being substantially equal and said reaction equality imparting to said winding definite impedance characteristics at selected frequencies.

36. In an alternating current circuit, an inductive winding connected in said circuit and composed of a plurality of turns with average diameters varying along the axis thereof, and a dielectric medium increasing the distributed capacitance of said winding for imparting a low impedance characteristic to said winding at a particular frequency, said diameter variation eliminating impedance minima in said winding between zero frequency and said particular frequency.

HERMAN POTTS MILLER, Jr.